Feb. 24, 1931.  A. RILEY  1,794,323
BONNET AND SCUTTLE FOR MOTOR VEHICLES
Filed Dec. 7, 1928  3 Sheets-Sheet 3

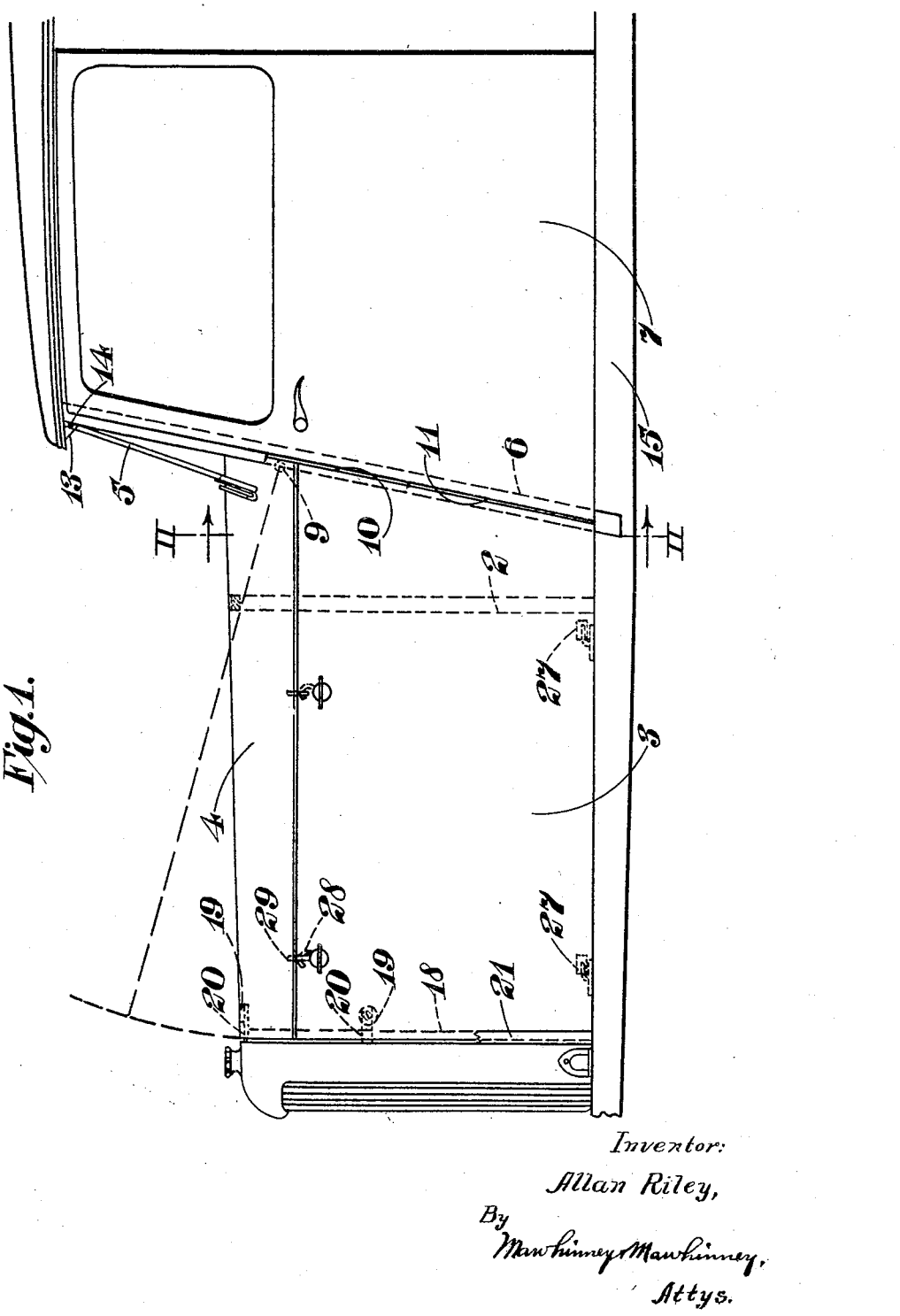

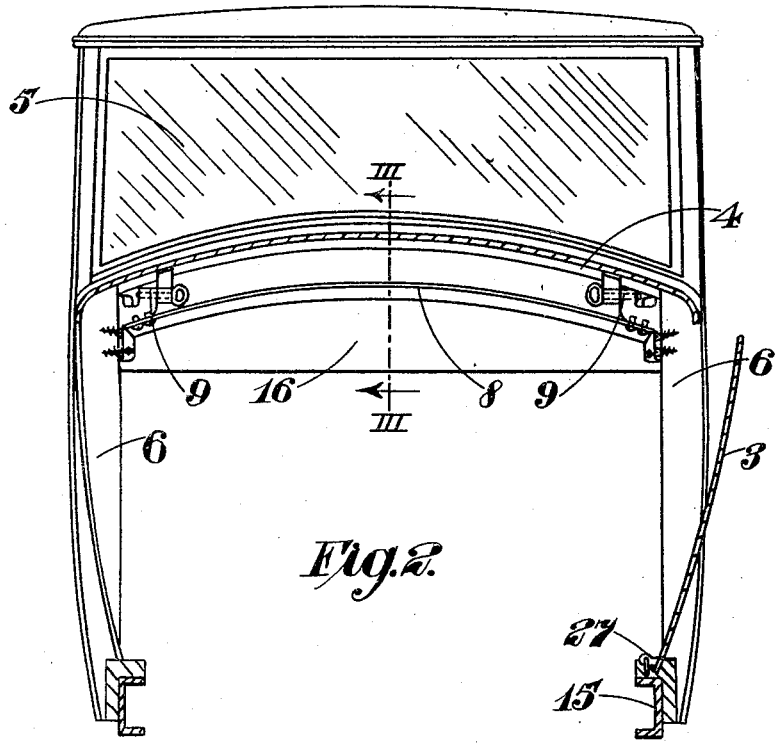
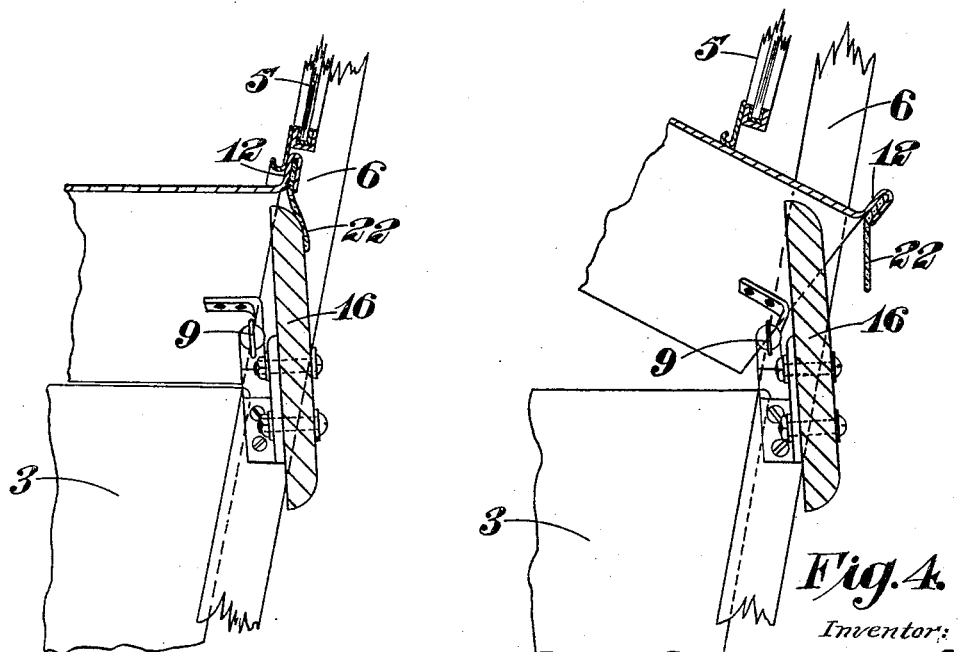

Inventor:
Allan Riley,
By Mawhinney & Mawhinney
Attys.

Patented Feb. 24, 1931

1,794,323

UNITED STATES PATENT OFFICE

ALLAN RILEY, OF COVENTRY, ENGLAND

BONNET AND SCUTTLE FOR MOTOR VEHICLES

Application filed December 7, 1928, Serial No. 324,459, and in Great Britain March 13, 1928.

This invention relates to bonnets and scuttles for motor vehicles, and it has for its object to provide a neater arrangement than usual, and one which is simpler to fit.

In the accompanying drawings, which illustrate the invention,

Figure 1 is a fragmentary side view of the front part of a motor vehicle,

Figure 2 is a cross section on the line II, II of Figure 1 as seen in the direction of the arrows, Figure 3, to a larger scale than the foregoing is a fragmentary section on the line III, III of Figure 2, the top part of the bonnet being in the closed position, Figure 4 is a view similar to Figure 3 but showing the top part of the bonnet and the windscreen in their partially open positions.

Like numerals indicate like parts throughout the drawings.

Figure 5:
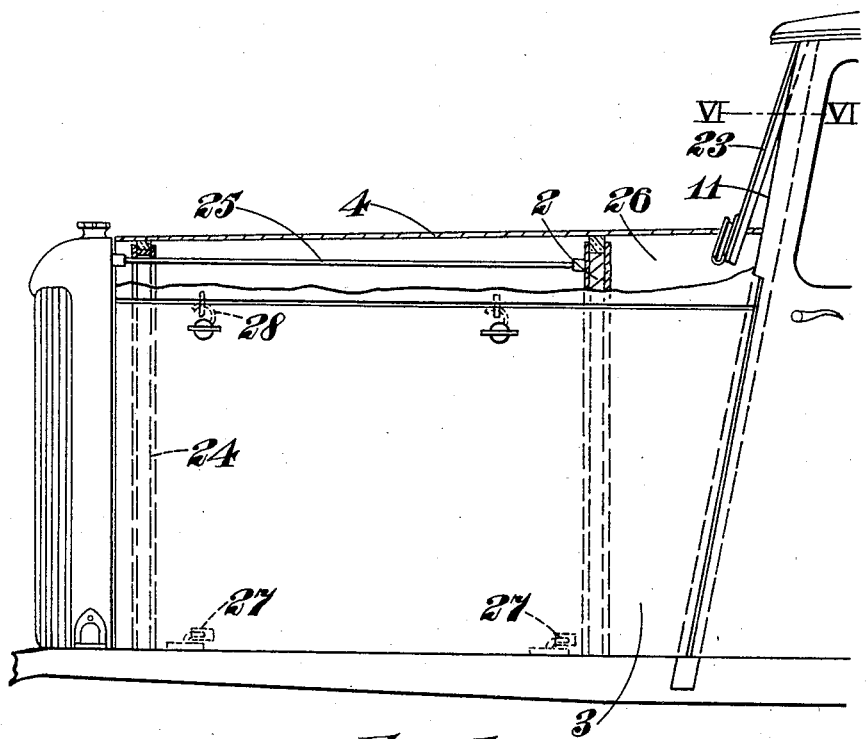
Figure 5 is another fragmentary side elevation partly in section, of the front part of a motor vehicle, showing slight modifications.

In the arrangement shown in Figures 1–4, there is a dashboard 2 behind the engine, but externally there is no indication of this as the whole bonnet comprising the side parts 3 and top part 4 extends back as far as the windscreen 5 but bears against the top and side edges of the dashboard. In or close to the plane of the windscreen is some part of the body framework, such as the pillars 6, against the sides of which the front doors 7 close, or to which they are hinged. The pillars may be bridged by a transverse member 8 which with the lower parts of the pillars 6, forms in effect, an arch.

To the upper edge of this transverse member 8 is hinged at 9 the top part 4 of the bonnet, whilst the side parts 3 close against the sides of the pillars and, if desired, their edges 10 may be concealed by a lip 11 on the front edges of the doors, although in the drawing a gap is shown between 10 and 11.

The rear end of the top part 4 of the bonnet has a small upwardly projecting flange or lip 12 (see Figures 3 and 4) which is adapted to lie behind the lower edge of the windscreen 5 and form a seal at this point, but the hinges 9 of the top part 4 are so positioned in relation to the lower edge of the windscreen that the top part 4 can be swung upwards without interfering with the screen. Thus the hinge axis may be at or behind the plane of the windscreen. In the example it is situated in the plane of the screen frame.

The latter is preferably of the single plane type pivoted at the top upon the pillars 6. These may have forwardly projecting brackets 13 carrying the pivots 14 for the screen, whilst the pillars 6 actually lie behind the plane of the screen and are supported from the chassis frame 15, or in any other suitable manner. The member 8 carries the instrument board 16, as shown, or alternatively might be constituted by it.

Thus there are no breaks in the line between the radiator 17 and the windscreen 5, so that a very neat appearance is obtained, and the bonnet can widen continuously from the radiator backwards in any suitable manner to conform to the body lines.

To cope with variations in distances between the member 8, to which the top part 4 of the bonnet is hinged, and the radiator 17, the front edges of the bonnet parts 3 and 4 may be supported on a relatively wide ledge 18 at the back of the radiator, but are preferably caused to rest on resilient pads 19 mounted on small brackets 20 attached to the rear of the radiator. Both methods allow for variations in the dimensions, and the bonnet may be held down on the rest by a strap member such as 21. This engages the front edge of the bonnet and overlaps the gap between them and the radiator so that such gap is concealed.

A soft seating for the bonnet can also be provided around the edges of the dashboard to provide flexibility.

Although the top of the bonnet may be ridged or curved transversely, the hinge axes are at a position near the edges of the top part 4 but concealed beneath it and are in alignment. Consequently when this top part is tilted up its rear edge would move in a curved path inwardly of the vehicle as shown in Figure 4, and at a level which would be somewhat above that of the instrument board 16. To provide a neat appearance, therefore, the inner end of the top part 4 has a depending flap 22 of flexible material, whose lower edge, when the bonnet is closed, lies neatly against the top edge of the instrument board. This flap is carried in the folded-over flange 12 at the rear end of the bonnet part 4.

Figure 6:
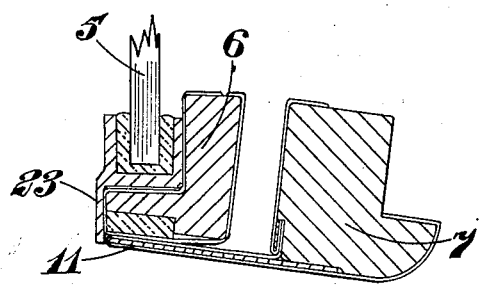
Figure 6 is a cross section on the line VI, VI of Figure 5 but to a larger scale.

In the construction shown by Figures 5 and 6, the lip on the door may be forwardly extended at the position above the bonnet so as to reach to the front face of the pillar, and the windscreen, which is also provided with lips 23 at its sides, has these extended to the outer edge of the pillar to cover the edges of the lips on the doors. Thus the pillar 6 is completely enclosed at the upper part above the bonnet and actually is only visible through the gap between the rear edge 10 of the bonnet and the adjacent part of the lip 11.

As before, the bonnet bears against the side and top edges of the dashboard 2 which may be covered with resilient material.

In some cases a support for the front portion of the bonnet is provided in a form which is quite distinct from the radiator as shown at 24 in Figure 5. The radiator may then be stayed to the engine, or the stays 25 for it are continued back to the dashboard 2. This prevents any movement of the radiator being transmitted to the bonnet and avoids buckling or rattle of the latter.

Among other obvious advantages which the invention provides is the ready accessibility of the interior of the scuttle space 26 when the bonnet is removed or opened. Thus the electrical wiring which is usually at the sides of this space can be reached when the bonnet is removed or opened, without the necessity for working from the interior of the body.

The hinges 27 for the bonnet sides 3 are fixed to the chassis side members 15 and when the bonnet sides are closed the latter are fastened to the top part 4 with either a hook or catch such as 28 which engages in a hoop or eye 29 on the inside of the bonnet top.

What I claim as my invention and desire to secure by Letters Patent of the United States is:—

1. In a motor vehicle, a radiator, a dash board spaced behind the radiator, an instrument board spaced rearwardly of the dash board, a wind screen extending in spaced relation above the instrument board, a bonnet top extending in an unbroken line between said radiator and the instrument board and having a flanged rear edge portion adapted in the closed position of the wind screen and bonnet top to close against said wind screen and lie in the space between the instrument board and wind screen.

2. In a motor vehicle, a radiator, a dash board spaced behind the radiator, an instrument board spaced behind the dash board, a wind screen situated in spaced relation above the instrument board, a bonnet top hinged at its rear edge below and in substantially the same plane with the closed wind screen and having its front portion extending to the radiator and its rear edge extending to and within the space between the wind screen and instrument board, and a flap carried by the rear edge of said bonnet top for resting against the upper part of the instrument board.

3. In a motor vehicle, a radiator, a dash board spaced from the radiator, an instrument board spaced from the dash board, a wind screen spaced above the instrument board, a bonnet top extending in an unbroken line from the radiator to the wind screen and having its rear edge provided with a flange extending between the wind screen and the instrument board and adapted to close against the wind screen, a flap carried by the flanged rear end of said bonnet top for lying against the rear upper portion of the instrument board in the closed position of the bonnet top, and pivots for the bonnet top engaged with the rear portion thereof below the wind screen.

4. In a motor vehicle, a frame, a radiator thereon, a dash board extending in rear of the radiator, side posts extending in rear of the dash board, an arch member extending between said posts, an instrument board carried by said arch member and posts, a wind screen carried above said instrument board, pivots carried by the arch member, a bonnet top having an upper and curved side portions, said side portions carried by said pivots, said top extending in an unbroken sweep from the radiator to the wind screen, sides for the bonnet hinged at their lower edges to the frame and extending in an unbroken sweep from the radiator to the instrument board, and fastening means between the sides and top portion of the bonnet.

In testimony whereof I have signed my name to this specification.

ALLAN RILEY.